(12) United States Patent
Ikeda et al.

(10) Patent No.: US 11,926,904 B2
(45) Date of Patent: Mar. 12, 2024

(54) AQUEOUS COMPOSITION, METHOD FOR ROUGHENING STAINLESS STEEL SURFACE IN WHICH SAME IS USED, ROUGHENED STAINLESS STEEL, AND METHOD FOR MANUFACTURING SAME

(71) Applicant: MITSUBISHI GAS CHEMICAL COMPANY, INC., Chiyoda-ku (JP)

(72) Inventors: Kazuhiko Ikeda, Ashigarakami-gun (JP); Tomoko Fujii, Ashigarakami-gun (JP); Hiroshi Matsunaga, Ashigarakami-gun (JP); Satoshi Tamai, Ashigarakami-gun (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 70 days.

(21) Appl. No.: 17/616,884

(22) PCT Filed: Jun. 3, 2020

(86) PCT No.: PCT/JP2020/021997
§ 371 (c)(1),
(2) Date: Dec. 6, 2021

(87) PCT Pub. No.: WO2020/250784
PCT Pub. Date: Dec. 17, 2020

(65) Prior Publication Data
US 2022/0325419 A1 Oct. 13, 2022

(30) Foreign Application Priority Data
Jun. 11, 2019 (JP) .................................. 2019-108621

(51) Int. Cl.
*C23F 1/28* (2006.01)

(52) U.S. Cl.
CPC ...................................... *C23F 1/28* (2013.01)

(58) Field of Classification Search
CPC ........... C23F 1/28; Y02E 60/10; H01M 4/669
(Continued)

(56) References Cited

U.S. PATENT DOCUMENTS 3,960,560 A 6/1976 Sato
9,301,399 B2* 3/2016 Suzuki .................. H05K 3/383
(Continued)

FOREIGN PATENT DOCUMENTS

CN 104805440 A 7/2015
EP 2 141 014 A1 1/2010
(Continued)

OTHER PUBLICATIONS

Socratic Q&A, percentage composition of Cu and Cl in CuCl2 (Year: 2014).*
(Continued)

*Primary Examiner* — Duy Vu N Deo
(74) *Attorney, Agent, or Firm* — Oblon, McClelland, Maier & Neustadt, L.L.P.

(57) ABSTRACT

Provided are an aqueous composition with which the surface of stainless steel is adequately roughened in an efficient manner with few steps, a method for roughening stainless steel, etc. The problem mentioned above is solved by an aqueous composition for roughening the surface of stainless steel, the aqueous composition including 0.1-20 mass % of hydrogen peroxide with reference to the total amount of the aqueous composition, 0.25-40 mass % of copper ions with reference to the total amount of the aqueous composition, and 1-30 mass % of halide ions with reference to the total amount of the aqueous composition.

3 Claims, 1 Drawing Sheet

(58) Field of Classification Search
USPC .................................. 116/108; 438/745–754
See application file for complete search history.

(56) References Cited

U.S. PATENT DOCUMENTS

| | | | |
|---|---|---|---|
| 2010/0119836 A1 | 5/2010 | Naritomi et al. | |
| 2012/0202101 A1 | 8/2012 | Ueda | |
| 2016/0372276 A1* | 12/2016 | Han | C25D 5/12 |
| 2017/0283979 A1* | 10/2017 | Yoshikane | C01B 7/096 |
| 2018/0242457 A1* | 8/2018 | Shpaisman | C23F 1/02 |
| 2020/0194779 A1 | 6/2020 | Kawaguchi | |

FOREIGN PATENT DOCUMENTS

| | | |
|---|---|---|
| EP | 3 124 650 A1 | 2/2017 |
| EP | 3 675 257 A1 | 7/2020 |
| JP | 50-65233 | 6/1975 |
| JP | 2011-168017 A | 9/2011 |
| JP | 5302315 B2 | 10/2013 |
| JP | 2015-183239 A | 10/2015 |
| WO | WO 2016/041407 A1 | 3/2016 |
| WO | WO 2019/039332 A1 | 2/2019 |

OTHER PUBLICATIONS

International Search Report dated Sep. 1, 2020 in PCT/JP2020/021997 filed on Jun. 3, 2020, 2 pages.

* cited by examiner

# AQUEOUS COMPOSITION, METHOD FOR ROUGHENING STAINLESS STEEL SURFACE IN WHICH SAME IS USED, ROUGHENED STAINLESS STEEL, AND METHOD FOR MANUFACTURING SAME

CROSS-REFERENCE TO RELATED APPLICATIONS

The present application is a 35 U.S.C. § 371 national stage patent application of International patent application PCT/JP2020/021997, filed on Jun. 3, 2020 which is based on and claims the benefits of priority to Japanese Application No. 2019-108621, filed on Jun. 11, 2019. The entire contents of these applications are incorporated herein by reference.

TECHNICAL FIELD

The present invention relates to an aqueous composition, in particular, an aqueous composition to be used for treating the surface of stainless steel, a method for roughening the surface of stainless steel, etc.

BACKGROUND ART

Recently, use of stainless steel in various fields has been examined because of its excellent durability and weather resistance. For example, use of stainless steel in electronic components, current collector foils for batteries and cases for automobile components has been promoted. Specifically, when using stainless steel in current collector foils for batteries and cases for automobile components, the surface of stainless steel is roughened for the purpose of adhering a dielectric material and an organic substance. Further, when using stainless steel for heat dissipation, the surface of stainless steel is roughened for the purpose of promoting heat dissipation.

When stainless steel is used in respective products for such applications, it is desired to increase the surface area. In this regard, for example, a method in which the surface of stainless steel is treated with a treatment solution containing iron chloride, etc. are known (e.g., Patent Document 1). However, according to this treatment method, many smooth portions exist even on the surface of stainless steel after the treatment, and therefore it cannot be necessarily said that stainless steel is adequately roughened to be used for the above-described applications.

As a method for roughening the surface of stainless steel, a method in which wet peening is combined with a roughening treatment using a chemical solution has been found (e.g., Patent Document 2), but according to the method, a plurality of steps are required. For this reason, there is a room for improvement with respect to promoting efficiency of the roughening treatment.

PATENT DOCUMENTS

Patent Document 1: Japanese Laid-Open Patent Publication No. 2011-168017
Patent Document 2: Japanese Laid-Open Patent Publication No. 2015-183239

SUMMARY OF THE INVENTION

Problems to be Solved by the Invention

As described above, in the conventional roughening treatment of the surface of stainless steel, the level of roughening is not necessarily sufficient, and the treatment time and the cost are increased because a complicated process is required. In such circumstances, it has been desired to develop a method by which the surface of stainless steel can be adequately roughened in an efficient manner with a simple process.

Means for Solving the Problems

The present inventors diligently made researches in order to solve the above-described problems and found that the surface of stainless steel can be adequately roughened in an efficient manner with few steps by using an aqueous composition having a specific composition, and thus the present invention was achieved.

Specifically, the present invention is as described below.
[1] An aqueous composition for roughening the surface of stainless steel, which comprises:
0.1 to 20% by mass of hydrogen peroxide with reference to the total amount of the aqueous composition;
0.25 to 40% by mass of copper ions with reference to the total amount of the aqueous composition; and
1 to 30% by mass of halide ions with reference to the total amount of the aqueous composition.
[2] The aqueous composition according to item [1], which comprises at least one of copper sulfate and copper chloride as a compound for supplying the copper ions.
[3] The aqueous composition according to item [1] or [2], which comprises at least one selected from the group consisting of hydrochloric acid, sodium chloride and copper chloride as a compound for supplying the halide ions.
[4] The aqueous composition according to any one of items [1] to [3], which comprises:
0.1 to 3.0% by mass of hydrogen peroxide with reference to the total amount of the aqueous composition;
1.5 to 10% by mass of the copper ions with reference to the total amount of the aqueous composition; and
8 to 15% by mass of the halide ions with reference to the total amount of the aqueous composition.
[5] A method for roughening stainless steel, which includes a roughening step in which a roughening treatment of the surface of stainless steel is performed by using the aqueous composition according to any one of items [1] to [4].
[6] The method for roughening stainless steel according to item [5], wherein the temperature for the roughening treatment is 20 to 60° C.
[7] The method for roughening stainless steel according to item [5] or [6], wherein the time for the roughening treatment is 30 seconds to 120 seconds.
[8] The method for roughening stainless steel according to any one of items [5] to [7], wherein the surface of stainless steel subjected to the roughening treatment has a maximum height (Rz) of 2.0 μm or more.
[9] The method for roughening stainless steel according to any one of items [5] to [8], wherein the surface of stainless steel subjected to the roughening treatment has a maximum height (Rz) of 10.0 μm or less.
[10] The method for roughening stainless steel according to any one of items [5] to [9], wherein the value of the maximum height (Rz) of the surface of stainless steel subjected to the roughening treatment is at least 2.0 μm larger than the value of the maximum height (Rz) of the surface of untreated stainless steel.
[11] The method for roughening stainless steel according to any one of items [5] to [10], wherein the surface of stainless steel subjected to the roughening treatment has an arithmetic average roughness (Ra) of 0.5 µm or more.

[12] The method for roughening stainless steel according to any one of items [5] to [11], wherein the surface of stainless steel subjected to the roughening treatment has an arithmetic average roughness (Ra) of 1.0 µm or less.

[13] The method for roughening stainless steel according to any one of items [5] to [12], wherein the arithmetic average roughness (Ra) of the surface of stainless steel subjected to the roughening treatment is at least 0.1 µm larger than the arithmetic average roughness (Ra) of the surface of untreated stainless steel.

[14] The method for roughening stainless steel according to any one of items [5] to [13], wherein the etching rate of said stainless steel in the roughening treatment is 0.5 µm/min or higher.

[15] A stainless steel, wherein the surface thereof is subjected to a roughening treatment by using the aqueous composition according to any one of items [1] to [4].

[16] The stainless steel according to item [15], wherein the surface of stainless steel subjected to the roughening treatment has a maximum height (Rz) of 2.0 µm or more.

[17] The stainless steel according to item [15] or [16], wherein the surface of stainless steel subjected to the roughening treatment has a maximum height (Rz) of 10.0 µm or less.

[18] The roughened stainless steel according to any one of items [15] to [17], wherein the surface of stainless steel subjected to the roughening treatment has an arithmetic average roughness (Ra) of 0.5 µm or more.

[19] The roughened stainless steel according to any one of items [15] to [18], wherein the surface of stainless steel subjected to the roughening treatment has an arithmetic average roughness (Ra) of 1.0 µm or less.

[20] The stainless steel according to any one of items [15] to [19], which is at least one of:
 a chrome-nickel stainless steel including SUS304, SUS316, SUS321, SUS347 and SUS329J1;
 a ferritic stainless steel (chrome stainless steel) including SUS405, SUS430, SUS434, SUS447 and SUSXM27; and
 a precipitation hardening type (chrome-nickel stainless steel) including SUS630, SUS631 and SUH660, which are defined by JISG4305.

[21] The roughened stainless steel according to any one of items [15] to [20], which is a stainless steel foil.

[22] A current collector foil for batteries, a solar cell substrate, a flexible substrate for electronic devices, a substrate for power storage devices, a catalyst carrier, an electromagnetic wave shielding member or a heat dissipation member, which includes the roughened stainless steel according to any one of items [15] to [21].

[23] A method for producing a roughened stainless steel whose surface is roughened, which has a roughening step in which a roughening treatment of the surface of stainless steel is performed by using the composition according to any one of items [1] to [4].

[24] The method for producing a roughened stainless steel according to item [23], wherein the surface of stainless steel subjected to the roughening treatment has a maximum height (Rz) of 2.0 µm or more.

[25] The method for producing a roughened stainless steel according to item [23] or [24], wherein the surface of stainless steel subjected to the roughening treatment has a maximum height (Rz) of 10.0 µm or less.

[26] The method for producing a roughened stainless steel according to any one of items [23] to [25], wherein the surface of stainless steel subjected to the roughening treatment has an arithmetic average roughness (Ra) of 0.5 µm or more.

[27] The method for producing a roughened stainless steel according to any one of items [23] to [26], wherein the surface of stainless steel subjected to the roughening treatment has an arithmetic average roughness (Ra) of 1.0 µm or less.

[28] The method for producing a roughened stainless steel according to any one of items [23] to [27], wherein the arithmetic average roughness (Ra) of the surface of stainless steel subjected to the roughening treatment is at least 0.1 µm larger than the arithmetic average roughness (Ra) of the surface of untreated stainless steel.

[29] The method for producing a roughened stainless steel according to any one of items [23] to [28], wherein the etching rate of said stainless steel in the roughening treatment is 0.5 µm/min or higher.

[30] The method for producing a roughened stainless steel according to any one of items [23] to [29], wherein said stainless steel is at least one of:
 a chrome-nickel stainless steel including SUS304, SUS316, SUS321, SUS347 and SUS329J1;
 a ferritic stainless steel (chrome stainless steel) including SUS405, SUS430, SUS434, SUS447 and SUSXM27; and
 a precipitation hardening type (chrome-nickel stainless steel) including SUS630, SUS631 and SUH660, which are defined by JISG4305.

[31] The method for producing a roughened stainless steel according to any one of items [23] to [30], wherein said stainless steel is a stainless steel foil.

[32] A current collector foil for batteries, a solar cell substrate, a flexible substrate for electronic devices, a substrate for power storage devices, a catalyst carrier, an electromagnetic wave shielding member or a heat dissipation member, which includes a roughened stainless steel produced by the production method according to any one of items [23] to [31].

Advantageous Effect of the Invention

According to the present invention, the surface of stainless steel can be adequately roughened by an efficient method with a small number of steps.

EMBODIMENTS FOR CARRYING OUT THE INVENTION

Hereinafter, the present invention will be described in detail, but the present invention is not limited to the below-described matters and can be variously modified without departing from the gist of the present invention.

[1. Aqueous Composition]

The aqueous composition of the present invention is suitably used for the roughening treatment of metal surfaces, that is, the treatment in which metal surfaces are roughened to increase roughness. Preferred examples of materials to be subjected to the roughening treatment using the aqueous composition of the present invention include various stainless steels which will be described in detail later.

The aqueous composition of the present invention comprises 0.1 to 20% by mass of hydrogen peroxide, 0.25 to 40% by mass of copper ions and 1 to 30% by mass of halide ions with reference to the total amount of the aqueous composition. In addition to these components, the aqueous composition comprises water, in particular, ion-exchanged water or ultrapure water.

Hereinafter, respective components of the aqueous composition will be described.

1-1. Hydrogen Peroxide

Hydrogen peroxide to be contained in the aqueous composition of the present invention is usually mixed with other components as an aqueous solution having an adequate concentration. The concentration of hydrogen peroxide in the aqueous solution of hydrogen peroxide to be used in the production of the aqueous composition is not particularly limited, and for example, it may be 10 to 90%, and it is preferably 35 to 60% which conforms to the industrial standards.

Further, hydrogen peroxide may include a stabilizer in an amount of up to about 0.01% by mass, and examples of acceptable stabilizers include sulfuric acid and phosphoric acid. The production process and means of acquisition of hydrogen peroxide are not limited, and for example, hydrogen peroxide produced by the anthraquinone method or the like is used.

The concentration of hydrogen peroxide contained in the aqueous composition is 0.1 to 20% by mass, but it is preferably 0.12 to 15% by mass, more preferably 0.15 to 10% by mass, and particularly preferably 0.18 to 8% by mass. Further, the lower limit of the concentration of hydrogen peroxide contained in the aqueous composition may be, for example, 0.2% by mass, and the upper limit of the concentration of hydrogen peroxide contained in the aqueous composition may be, for example, 5% by mass, 3% by mass or 2% by mass. The range of the concentration of hydrogen peroxide can be suitably selected, for example, from among 0.1 to 5.0% by mass, 0.1 to 3.0% by mass, 0.1 to 2.0% by mass, 0.2 to 20% by mass, 0.2 to 5.0% by mass, 0.2 to 3.0% by mass, 0.2 to 2.0% by mass, etc.

1-2. Copper Ions

The copper ions to be contained in the aqueous composition of the present invention can be generated by mixing a copper compound as a copper ion source with other components. The type of the copper ion source is not particularly limited as long as it is a copper compound that can supply copper ions in the aqueous composition.

Examples thereof include copper sulfate such as copper (II) sulfate, copper chloride such as copper (II) chloride, copper tetrafluoroborate, copper (II) bromide, copper (II) oxide, copper phosphate, copper acetate, copper formate and copper nitrate, which may be an anhydride or a pentahydrate. Among them, from the viewpoint of more effective and secure exertion of the effects of the present invention, ease of handling and economic efficiency, copper sulfate or copper chloride is preferred, copper (II) sulfate or copper (II) chloride is more preferred, and copper (II) sulfate is even more preferred. These materials may be used solely, or two or more of them may be used in combination.

A substitution reaction with respect to nickel and chrome that are components of stainless steel is caused by the copper ions contained in the aqueous composition in the roughening treatment, and it is inferred that a roughened form is obtained by removing a substitution reaction product derived from the copper ions after that.

The concentration of the copper ions contained in the aqueous composition is 0.25 to 40% by mass, but it is preferably 0.25 to 30% by mass or 1.0 to 30% by mass, more preferably 0.5 to 25% by mass or 3.0 to 25% by mass, and particularly preferably 1.5 to 20% by mass or 5.0 to 20% by mass. Further, among the above-described values, the lower limit of the concentration of the copper ions contained in the aqueous composition may be 1.0% by mass, 1.5% by mass or the like, and the upper limit of the concentration of the copper ions contained in the aqueous composition may be, for example, 15% by mass, 10% by mass, 9% by mass or the like. The range of the concentration of the copper ions may be, for example, 1.0 to 9% by mass, 1.0 to 10% by mass, 1.5 to 9% by mass, 1.5 to 10% by mass or the like.

1-3. Halide Ions (Halogen Ions)

The type of the halide ions contained in the aqueous composition of the present invention is not particularly limited. For example, the halide ions may be fluoride ions, chloride ions, bromide ions or iodide ions, but from the viewpoint of ease of handling and economic efficiency, chloride ions are more preferred.

The halogen compound that provides the halide ions is not particularly limited, and examples thereof include a halide of an alkali metal such as sodium halide and potassium halide, a halide of an alkaline earth metal such as calcium halide, ammonium halide, copper halide and hydrogen halide. Among them, from the viewpoint of more effective and secure exertion of the effects of the present invention, a halide of an alkali metal or hydrogen halide is preferred, and hydrochloric acid or sodium chloride is more preferred.

As the halogen compound, such materials may be used solely, or two or more of them may be used in combination. Note that the halogen compound may overlap with the above-described copper compound. For example, when using a copper halide as a source of the halide ions, said copper halide also corresponds to the copper compound as the copper ion source. As the copper halide, copper chloride is preferred. The halogen compound (halide ions) causes pitting corrosion with respect to a passive film in the roughening treatment of the surface of stainless steel.

The concentration of the halide ions contained in the aqueous composition is 1 to 30% by mass, but it is preferably 2.0 to 25% by mass, more preferably 3.0 to 20% by mass, particularly preferably 5.0 to 15% by mass, and even more preferably 8 to 15% by mass. Further, regarding the range of the concentration of the halide ions contained in the aqueous composition, the lower limit may be any of 1.0% by mass, 2.0% by mass, 3.0% by mass, 5.0% by mass and 8% by mass, and the upper limit may be any of 30% by mass, 25% by mass, 20% by mass, 15% by mass and 10% by mass.

1-4. Additive Contained in Aqueous Composition

The aqueous composition of the present invention may comprise an additive as a component other than the above-described hydrogen peroxide, copper ions and halide ions within a range in which the effects of the present invention are exerted. Examples of the additive include a heterocyclic nitrogen compound (azole-based compound) and an organic solvent. These additives may be used solely, or two or more of them may be used in combination. Examples of the additive also include a surfactant and a pH adjuster, but it is better that these materials are not contained in the aqueous composition of the present invention.

The concentration of the additive that may be contained in the aqueous composition is preferably 10% by mass or less, more preferably 5.0% by mass or less, even more preferably 2.0% by mass or less, and particularly preferably 1.0% by mass or less.

1-5. Functions and Characteristics of Aqueous Composition

It is considered that the aqueous composition comprising the above-described components functions as described below in the roughening treatment of the surface of stainless steel.

The halide ions play a role to cause pitting corrosion of an oxide film usually formed on the surface of stainless steel. As described above, the copper ions have the action to cause a substitution reaction with respect to nickel and chrome that are components of stainless steel, and it is considered that after that, a substitution reaction product derived from the copper ions is removed, thereby forming a concavo-convex shape having a large Rz, i.e., a roughened form on the surface of stainless steel.

Further, hydrogen peroxide plays a role to remove the substitution reaction product derived from the copper ions after the substitution reaction.

The aqueous composition of the present invention is prepared by adding the above-described component containing hydrogen peroxide, component for supplying the copper ions, component for supplying the halide ions and water, and according to need, other components and stirring the mixture until it becomes homogeneous.

Characteristics of the aqueous composition are not particularly limited, but the pH value is preferably −1.0 to 4.0, more preferably −0.5 to 3.0, even more preferably −0.25 to 2.5, and particularly preferably 0.0 to 2.0. The pH value can be measured by the method described in the Examples.

[2. Method for Roughening Stainless Steel]

In the method for roughening stainless steel of the present invention, a roughening step in which a roughening treatment of the surface of stainless steel is performed by using the above-described aqueous composition is carried out. In this regard, the roughening treatment of the surface of stainless steel performed by using the aqueous composition means that the aqueous composition is brought into contact with the surface of stainless steel. As is clear from this, the method for roughening stainless steel of the present invention includes at least a step in which the aqueous composition is brought into contact with the surface of stainless steel.

In the roughening step, the temperature for the roughening treatment is preferably 20 to 60° C., more preferably 25 to 55° C., and particularly preferably 30 to 50° C. Thus, the method for roughening stainless steel of the present invention is excellent on the point that roughening of the surface of stainless steel is progressed even if the temperature is not so high, for example, even at room temperature (25° C.). In this regard, the temperature for the roughening treatment means a temperature at which the aqueous composition is brought into contact with the surface of stainless steel, in particular, a solution temperature of the aqueous composition to be brought into contact with the surface of stainless steel.

Further, in the roughening step, the time for the roughening treatment is preferably 30 seconds to 120 seconds, more preferably 40 seconds to 100 seconds, and particularly preferably 50 seconds to 90 seconds. Thus, the method for roughening stainless steel of the present invention is excellent on the point that roughening of stainless steel is progressed even if the time is not so long. In this regard, the time for the roughening treatment means the time during which the aqueous composition is brought into contact with the surface of stainless steel. For example, it is the time during which stainless steel is immersed in the aqueous composition, or the time from when the aqueous composition is sprayed on the surface of stainless steel till when the aqueous composition is removed with water or the like.

The method for bringing the aqueous composition into contact with the surface of stainless steel is not particularly limited. For example, a method in which the aqueous composition of the present invention is brought into contact with stainless steel by means of dropping, spraying (spray treatment) or the like, a method in which stainless steel is immersed in the aqueous composition of the present invention or the like can be employed. In the present invention, any of such methods may be employed. Examples of such methods include a method in which the aqueous composition of the present invention is sprayed on a processed stainless steel having a specific shape to obtain a roughened stainless steel, and a method in which: a dropping apparatus, spraying apparatus or immersion apparatus for the aqueous composition of the present invention is placed between rolls for a stainless steel foil; using a roll-to-roll technique, an untreated stainless steel foil is spread from a roll around which it is wound and moved; during the movement, the stainless steel foil is passed through an area near the above-described apparatus to supply the aqueous composition; and the roughened stainless steel foil is wound around another roll, thereby obtaining it.

According to the method for roughening stainless steel of the present invention, the maximum height (Rz) of the surface of stainless steel subjected to the roughening treatment (in this specification, it is also referred to as a "roughened stainless steel", and a stainless steel foil (film or sheet) subjected to the roughening treatment is also included in the stainless steel) can be set to be 2.0 μm or more, for example, 3.0 μm or more. According to the method for roughening stainless steel of the present invention, the maximum height (Rz) of the surface of stainless steel can be set to be preferably 4.0 μm or more, more preferably 4.5 μm or more, even more preferably 5.0 μm or more, and particularly preferably 5.5 μm or more. Further, the upper limit of the maximum height (Rz) of the surface of stainless steel subjected to the roughening treatment is not particularly limited, but for example, it is 10.0 μm or less, and it may be 7.0 μm or less.

Note that the maximum height (Rz) of the surface of stainless steel not subjected to the roughening treatment (untreated stainless steel) is not particularly limited, but for example, it is 0.2 to 2.0 μm or the like, and it may be about 1.0 to 1.5 μm.

According to the method for roughening stainless steel of the present invention, a surface of the roughened stainless steel can have a value of the maximum height (Rz) which is at least 2.0 μm larger than the value of the maximum height (Rz) of the surface of untreated stainless steel, and it is preferably at least 3.0 μm larger than untreated stainless steel.

According to the method for roughening stainless steel of the present invention, the arithmetic average roughness (Ra) of the surface of the roughened stainless steel can be set to be 0.5 μm or more. According to the method for roughening stainless steel of the present invention, the arithmetic average roughness (Ra) of the surface of the roughened stainless steel can be set to be preferably 0.6 μm or more, more preferably 0.7 μm or more, and even more preferably 0.8 μm or more.

Further, the upper limit of the arithmetic average roughness (Ra) of the surface of the roughened stainless steel is not particularly limited, but for example, it is 1.0 μm or less, and it may be 0.9 μm or less.

Note that the arithmetic average roughness (Ra) of untreated stainless steel is not particularly limited, but for example, it is 0.1 to 0.3 μm.

According to the method for roughening stainless steel of the present invention, the arithmetic average roughness (Ra) of the surface of the roughened stainless steel can be set to be at least 0.1 μm larger than the arithmetic average roughness (Ra) of the surface of untreated stainless steel, and it is preferably at least 0.2 μm, and more preferably at least 0.3 μm larger than untreated stainless steel.

The above-described maximum height (Rz) and arithmetic average roughness (Ra) are calculated in accordance with JIS B 0601-2001. The apparatus to be used for the measurement is not particularly limited, but for example, a laser microscope can be used.

The etching rate of stainless steel in the roughening treatment is not particularly limited, but for example, it is 0.5 μm/min or higher, and it is preferably 0.7 μm/min or higher, more preferably 1.0 μm/min or higher, even more preferably 1.2 μm/min or higher, and particularly preferably 1.4 μm/min or higher.

According to the above-described method for roughening stainless steel, a stainless steel in which the surface roughness is increased can be obtained only by a substantially one-step treatment, that is, the roughening treatment in which the aqueous composition of the present invention is brought into contact with the surface of stainless steel to be treated, or according to need, additionally performing washing adequately (e.g., washing with water). Further, since the treatment conditions in the roughening treatment are moderate and the required time is short as described above, according to the present invention, the roughening treatment of stainless steel can be efficiently carried out.

[3. Stainless Steel]

The type of stainless steel to be subjected to the roughening treatment using the aqueous composition of the present invention is not particularly limited, and examples thereof include: a chrome-nickel stainless steel including SUS304, SUS316, SUS321, SUS347 and SUS329J1; a ferritic stainless steel (chrome stainless steel) including SUS405, SUS430, SUS434, SUS447 and SUSXM27; and a precipitation hardening type (chrome-nickel stainless steel) including SUS630, SUS631 and SUH660, which are defined by JISG4305.

Further, the size, thickness and shape of stainless steel to be subjected to the roughening treatment are not particularly limited, and for example, a stainless steel foil can be subjected to the roughening treatment. The thickness of the stainless steel foil to be subjected to the roughening treatment is not particularly limited, but for example, it is 1 μm to 500 μm, and it is preferably 10 μm to 100 μm.

Further, as described above, the maximum height (Rz) of the surface of stainless steel subjected to the roughening treatment is, for example, 2.0 μm or more, and it is preferably 3.0 μm or more, more preferably 4.0 μm or more, even more preferably 4.5 μm or more, still more preferably 5.0 μm or more, and particularly preferably 5.5 μm or more.

The upper limit of the maximum height (Rz) of the surface of stainless steel subjected to the roughening treatment is not particularly limited, but for example, it is 10.0 μm or less, and it may be 7.0 μm or less.

The arithmetic average roughness (Ra) of the surface of the roughened stainless steel is, for example, 0.5 μm or more, and it is preferably 0.6 μm or more, more preferably 0.7 μm or more, and even more preferably 0.8 μm or more.

The upper limit of the arithmetic average roughness (Ra) of the surface of the roughened stainless steel is not particularly limited, but for example, it is 1.0 μm or less, and it may be 0.9 μm or less.

[4. Method for Producing Stainless Steel]

The method for producing stainless steel of the present invention has at least the above-described roughening step. According to the method for producing stainless steel of the present invention, a stainless steel whose surface is rougher than that before the roughening treatment, i.e., a stainless steel having a surface in which the roughness is increased when compared to that of the surface before the treatment, can be produced.

The stainless steel to be used in the method for producing stainless steel of the present invention is as described in [3. Stainless steel] above.

The maximum height (Rz) and arithmetic average roughness (Ra) of the surface of stainless steel subjected to the roughening treatment obtained by the method for producing stainless steel of the present invention are as described in [3. Stainless steel] above.

The stainless steel subjected to the roughening treatment obtained by the method for producing stainless steel of the present invention can be used for applications including a current collector foil for batteries such as solid state batteries and lithium ion batteries, a solar cell substrate, a flexible substrate for electronic devices, a substrate for power storage devices, a carrier for an exhaust gas purification catalyst or the like, an electromagnetic wave shielding member, a heat dissipation member, etc. The stainless steel foil subjected to the roughening treatment obtained by the method for producing stainless steel of the present invention is suitably used, for example, as a current collector foil for batteries.

EXAMPLES

Hereinafter, the present invention will be described in more detail based on working examples, but the present invention is not limited thereto.

(Measurement of Surface Roughness of Stainless Steel Foil)

With respect to a stainless steel foil as a raw material and the surface-treated foils obtained in the Examples and Comparative Examples, the maximum height (Rz) and arithmetic average roughness (Ra) in accordance with JIS B 0601-2001 were measured by using a laser microscope (manufactured by KEYENCE CORPORATION, product name: VK-X250).

(Observation of Surface of Stainless Steel Foil)

With respect to the surface-treated foils obtained in the Examples and Comparative Examples, the surface shape was observed by using a scanning electron microscope (manufactured by Hitachi High-Technologies Corporation, product name: S-3400N).

(Measurement of pH Value)

The pH value of each aqueous composition in the Examples and Comparative Examples was measured by using a pH meter (pH meter F-52 manufactured by HORIBA, Ltd.) at 25° C.

(Measurement of Etching Rate (E.R.))

With respect to the surface-treated foils obtained in the Examples and Comparative Examples, the difference in mass (D) of the stainless steel foil before and after the treatment with the aqueous composition was divided by the area S of the used stainless steel foil (area of the treatment with the aqueous composition), the density (ρ) of the stainless steel foil and the treatment time (T) to obtain the value of E.R. (μm/min).

This is as expressed by formula (1) below. Note that the unit of the value of E.R. directly calculated from formula (1) is "cm/min", and that the values with the unit of "μm/min" obtained by conversion are shown in Table 1, etc. below.

$$\frac{\text{Difference in mass (D) of stainless}}{\text{Density } (\rho) \text{ of stainless steel foil } (\text{g}/\text{cm}^3) \times} \quad (1)$$
$$\text{Area of stainless steel foil } (\text{cm}^2) \times$$
$$\text{Treatment time } (T) \text{ (min)}$$

Example 1

A stainless steel foil made of SUS304 having a thickness of 20 μm, a longitudinal length of 30 mm and a lateral length of 30 mm was prepared. Rz and Ra of the stainless steel foil were measured according to "Measurement of surface roughness of stainless steel foil" above. Rz was 1.2 μm and Ra was 0.2 μm.

To 130 ml of ultrapure water, hydrogen peroxide in an amount in which the final amount thereof became 0.2% by mass (0.7 g of 60 wt % aqueous solution of hydrogen peroxide), 6% by mass (12.0 g) of copper sulfate pentahydrate and 29% by mass (57.1 g) of 35 wt % aqueous solution of hydrochloric acid were added to prepare an aqueous composition. In the composition, the concentration of copper ions ($Cu^{2+}$) derived from copper sulfate was 1.5% by mass with reference to the total amount of the aqueous composition, and the concentration of halide ions ($Cl^-$) derived from hydrochloric acid was 10% by mass with reference to the total amount of the aqueous composition.

Figure 1:
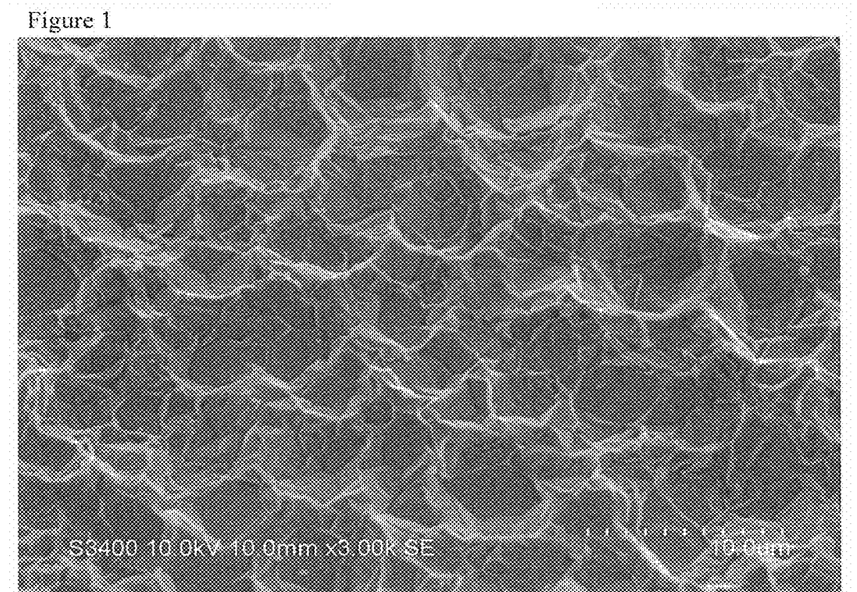
FIG. 1 is a scanning electron microscope (SEM) image showing the surface of stainless steel after the roughening treatment in Example 1.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. A microscopic image thereof is shown in FIG. 1. Further, the maximum height of the surface of the obtained surface-treated foil was measured according to "Measurement of surface roughness of stainless steel foil" above. Rz was 5.9 μm and Ra was 0.6 μm.

Example 2

A stainless steel foil made of SUS304 having a thickness of 20 μm, a longitudinal length of 30 mm and a lateral length of 30 mm was prepared.

To 124 ml of ultrapure water, hydrogen peroxide in an amount in which the final amount thereof became 2% by mass (6.7 g of 60 wt % aqueous solution of hydrogen peroxide), 6% by mass (12.0 g) of copper sulfate pentahydrate and 29% by mass (57.1 g) of 35 wt % aqueous solution of hydrochloric acid were added to prepare an aqueous composition. In the composition, the concentration of copper ions ($Cu^{2+}$) derived from copper sulfate was 1.5% by mass with reference to the total amount of the aqueous composition, and the concentration of halide ions ($Cl^-$) derived from hydrochloric acid was 10% by mass with reference to the total amount of the aqueous composition.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. Further, the maximum height of the surface of the obtained surface-treated foil was measured according to "Measurement of surface roughness of stainless steel foil" above. Rz was 5.1 μm and Ra was 0.9 μm.

Example 3

A stainless steel foil made of SUS304 having a thickness of 20 μm, a longitudinal length of 30 mm and a lateral length of 30 mm was prepared.

To 70 ml of ultrapure water, hydrogen peroxide in an amount in which the final amount thereof became 0.2% by mass (0.7 g of 60 wt % aqueous solution of hydrogen peroxide), 36% by mass (72.0 g) of copper sulfate pentahydrate and 29% by mass (57.1 g) of 35 wt % aqueous solution of hydrochloric acid were added to prepare an aqueous composition. In the composition, the concentration of copper ions ($Cu^{2+}$) derived from copper sulfate was 9.0% by mass with reference to the total amount of the aqueous composition, and the concentration of halide ions ($Cl^-$) derived from hydrochloric acid was 10% by mass with reference to the total amount of the aqueous composition.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. Further, the maximum height of the surface of the obtained surface-treated foil was measured according to "Measurement of surface roughness of stainless steel foil" above. Rz was 3.1 μm and Ra was 0.5 μm.

Example 4

A stainless steel foil made of SUS304 having a thickness of 20 μm, a longitudinal length of 30 mm and a lateral length of 30 mm was prepared.

To 142 ml of ultrapure water, hydrogen peroxide in an amount in which the final amount thereof became 0.2% by mass (0.7 g of 60 wt % aqueous solution of hydrogen peroxide), 6% by mass (12.0 g) of copper sulfate pentahydrate and 23% by mass (45.7 g) of 35 wt % aqueous solution of hydrochloric acid were added to prepare an aqueous composition. In the composition, the concentration of copper ions ($Cu^{2+}$) derived from copper sulfate was 1.5% by mass with reference to the total amount of the aqueous composition, and the concentration of halide ions (CO derived from hydrochloric acid was 8% by mass with reference to the total amount of the aqueous composition.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. Further, the maximum height of the surface of the obtained surface-treated foil was measured according to "Measurement of surface roughness of stainless steel foil" above. Rz was 3.0 μm and Ra was 0.5 μm.

Example 5

A stainless steel foil made of SUS304 having a thickness of 20 μm, a longitudinal length of 30 mm and a lateral length of 30 mm was prepared.

To 102 ml of ultrapure water, hydrogen peroxide in an amount in which the final amount thereof became 0.2% by mass (0.7 g of 60 wt % aqueous solution of hydrogen peroxide), 6% by mass (12.0 g) of copper sulfate pentahydrate and 43% by mass (85.7 g) of 35 wt % aqueous solution of hydrochloric acid were added to prepare an aqueous composition. In the composition, the concentration of copper ions ($Cu^{2+}$) derived from copper sulfate was 1.5% by mass with reference to the total amount of the aqueous composition, and the concentration of halide ions ($Cl^-$) derived from hydrochloric acid was 15% by mass with reference to the total amount of the aqueous composition.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. Further, the maximum height of the surface of the obtained surface-treated foil was measured according to "Measurement of surface roughness of stainless steel foil" above. Rz was 3.2 μm and Ra was 0.5 μm.

Example 6

A stainless steel foil made of SUS304 having a thickness of 20 μm, a longitudinal length of 30 mm and a lateral length of 30 mm was prepared.

To 96 ml of ultrapure water, hydrogen peroxide in an amount in which the final amount thereof became 0.2% by mass (0.7 g of 60 wt % aqueous solution of hydrogen peroxide), 23% by mass (46.4 g) of copper sulfate pentahydrate and 29% by mass (57.1 g) of 35 wt % aqueous solution of hydrochloric acid were added to prepare an aqueous composition. In the composition, the concentration of copper ions ($Cu^{2+}$) derived from copper sulfate was 5.8% by mass with reference to the total amount of the aqueous composition, and the concentration of halide ions ($Cl^-$) derived from hydrochloric acid was 10% by mass with reference to the total amount of the aqueous composition.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. Further, the maximum height of the surface of the obtained surface-treated foil was measured according to "Measurement of surface roughness of stainless steel foil" above. Rz was 3.0 μm and Ra was 0.5 μm.

Comparative Example 1

A stainless steel foil made of SUS304 having a thickness of 20 μm, a longitudinal length of 30 mm and a lateral length of 30 mm was prepared.

To 131 ml of ultrapure water, 6% by mass (12.0 g) of copper sulfate pentahydrate and 29% by mass (57.1 g) of 35 wt % aqueous solution of hydrochloric acid were added to prepare an aqueous composition. In the composition, the concentration of copper ions ($Cu^{2+}$) derived from copper sulfate was 1.5% by mass with reference to the total amount of the aqueous composition, and the concentration of halide ions ($Cl^-$) derived from hydrochloric acid was 10% by mass with reference to the total amount of the aqueous composition.

Figure 2:
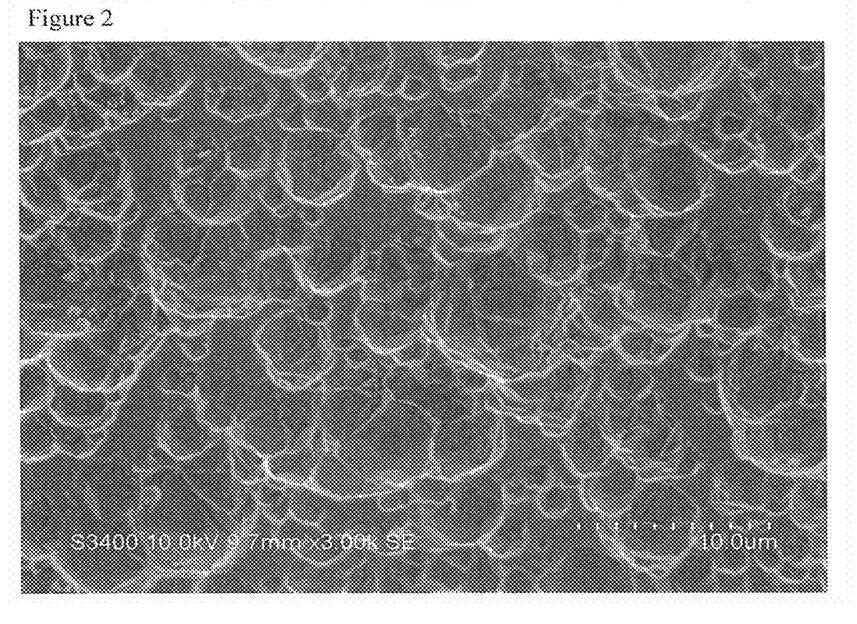
FIG. 2 is a scanning electron microscope (SEM) image showing the surface of stainless steel after the roughening treatment in Comparative Example 1.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. A microscopic image thereof is shown in FIG. 2. Further, the maximum height of the surface of the obtained surface-treated foil was measured according to "Measurement of surface roughness of stainless steel foil" above. Rz was 2.5 μm and Ra was 0.3 μm.

Comparative Example 2

A stainless steel foil made of SUS304 having a thickness of 20 μm, a longitudinal length of 30 mm and a lateral length of 30 mm was prepared.

To 187 ml of ultrapure water, hydrogen peroxide in an amount in which the final amount thereof became 0.2% by mass (0.7 g of 60 wt % aqueous solution of hydrogen peroxide) and 6% by mass (12.0 g) of copper sulfate pentahydrate were added to prepare an aqueous composition. In the composition, the concentration of copper ions ($Cu^{2+}$) derived from copper sulfate was 1.5% by mass with reference to the total amount of the aqueous composition.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The maximum height of the surface of the obtained surface-treated foil was measured according to "Measurement of surface roughness of stainless steel foil" above. No roughened state of the surface was seen, and the values of Ra and Rz were not changed from those before the treatment.

Comparative Example 3

A stainless steel foil made of SUS304 having a thickness of 20 μm, a longitudinal length of 30 mm and a lateral length of 30 mm was prepared.

To 142 ml of ultrapure water, hydrogen peroxide in an amount in which the final amount thereof became 0.2% by mass (0.7 g of 60 wt % aqueous solution of hydrogen peroxide) and 29% by mass (57.1 g) of 35 wt % aqueous solution of hydrochloric acid were added to prepare an aqueous composition. In the composition, the concentration of halide ions ($Cl^-$) derived from hydrochloric acid was 10% by mass with reference to the total amount of the aqueous composition.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. Further, the maximum height of the surface of the obtained surface-treated foil was measured according to "Measurement of surface roughness of stainless steel foil" above. Rz was 0.7 μm and Ra was 0.1 μm.

Comparative Example 4

A stainless steel foil made of SUS304 having a thickness of 20 μm, a longitudinal length of 30 mm and a lateral length of 30 mm was prepared.

To 131 ml of ultrapure water, hydrogen peroxide in an amount in which the final amount thereof became 0.05% by mass (0.2 g of 60 wt % aqueous solution of hydrogen peroxide), 6% by mass (12.0 g) of copper sulfate pentahydrate and 29% by mass (57.1 g) of 35 wt % aqueous solution of hydrochloric acid were added to prepare an aqueous composition. In the composition, the concentration of copper ions ($Cu^{2+}$ derived from copper sulfate was 1.5% by mass with reference to the total amount of the aqueous composition, and the concentration of halide ions ($Cl^-$) derived from hydrochloric acid was 10% by mass with reference to the total amount of the aqueous composition.

Firstly, the stainless steel foil was immersed in the aqueous composition at a solution temperature of 40° C. for 60 seconds. Next, the stainless steel foil after immersion was adequately washed with ultrapure water and then adequately dried to obtain a surface-treated foil. The obtained surface-treated foil was observed according to "Observation of surface of stainless steel foil" above. Further, the maximum height of the surface of the obtained surface-treated foil was measured according to "Measurement of surface roughness of stainless steel foil" above. Rz was 2.4 μm and Ra was 0.3 μm.

TABLE 1

| | Composition (% by mass) | | | | Treatment solution pH | Stainless steel | Roughening treatment | | | | Etching rate μm/min |
| | | | | | | | Ra (μm) | | Rz (μm) | | |
| | Hydrogen peroxide | Copper ions | Halogen ions | Pure water | | | Before treatment | After treatment | Before treatment | After treatment | |
|---|---|---|---|---|---|---|---|---|---|---|---|
| Example 1 | 0.2 | 1.5 | 10 | Remainder | 0.05 | SUS304 | 0.2 | 0.6 | 1.2 | 5.9 | 1.7 |
| Example 2 | 2 | 1.5 | 10 | Remainder | 0.05 | SUS304 | 0.2 | 0.9 | 1.2 | 5.1 | 3.6 |
| Example 3 | 0.2 | 9 | 10 | Remainder | 0.05 | SUS304 | 0.2 | 0.5 | 1.2 | 3.1 | 2.8 |
| Example 4 | 0.2 | 1.5 | 8 | Remainder | 0.05 | SUS304 | 0.2 | 0.5 | 1.2 | 3.0 | 2.3 |
| Example 5 | 0.2 | 1.5 | 15 | Remainder | 0.05 | SUS304 | 0.2 | 0.5 | 1.2 | 3.2 | 1.0 |
| Example 6 | 0.2 | 5.8 | 10 | Remainder | 0.05 | SUS304 | 0.2 | 0.5 | 1.2 | 3.0 | 2.6 |
| Comparative Example 1 | — | 1.5 | 10 | Remainder | 0.05 | SUS304 | 0.2 | 0.3 | 1.2 | 2.5 | 1.1 |
| Comparative Example 2 | 0.2 | 1.5 | — | Remainder | 2.93 | SUS304 | 0.2 | 0.2 | 1.2 | 1.2 | — |
| Comparative Example 3 | 0.2 | — | 10 | Remainder | 0.05 | SUS304 | 0.2 | 0.1 | 1.2 | 0.7 | 1.2 |
| Comparative Example 4 | 0.05 | 1.5 | 10 | Remainder | 0.05 | SUS304 | 0.2 | 0.3 | 1.2 | 2.4 | 1.0 |

INDUSTRIAL APPLICABILITY

According to the present invention, by using an aqueous composition having a specific composition, the surface of stainless steel can be adequately roughened in an efficient manner with few steps in a short time. Further, when using the stainless steel whose surface is roughened for a current collector foil for batteries, a case for automobile components or the like, a dielectric material and an organic substance can be effectively adhered and held. Further, the stainless steel whose surface is roughened can also be suitably used for a heat dissipation member.

Accordingly, the present invention is industrially applicable in the field of the roughening treatment of the surface of a member of a material, for example, stainless steel to be used in the above-described products.

The invention claimed is:

1. An aqueous composition for roughening a surface of a stainless steel, comprising:
    from 0.1 to 0.2% by mass of hydrogen peroxide with respect to the total amount of the aqueous composition;
    from 1.5 to 10% by mass of copper ions with respect to the total amount of the aqueous composition; and
    from 8 to 10% by mass of halide ions with respect to the total amount of the aqueous composition.

2. The aqueous composition according to claim 1, further comprising:
    at least one of copper sulfate and copper chloride that supplies the copper ions.

3. The aqueous composition according to claim 1, further comprising:
    at least one selected from the group consisting of hydrochloric acid, sodium chloride and copper chloride that supplies the halide ions.

\* \* \* \* \*